US007439850B2

(12) United States Patent
Boulard et al.

(10) Patent No.: US 7,439,850 B2
(45) Date of Patent: Oct. 21, 2008

(54) KEYLESS ENTRY SYSTEM

(75) Inventors: Robert Boulard, Massillon, OH (US); Jerrit Ekama, New Philadelphia, OH (US); Eric Harz, Freeport, OH (US); John J. Miller, Jr., Sugarcreek, OH (US); Ryan D. Luecke, Sugarcreek, OH (US); Charles R. Brackney, III, Baltic, OH (US); Daniel J. Miller, Dover, OH (US)

(73) Assignee: Superb Industries, Inc., Sugarcreek, OH (US)

( * ) Notice: Subject to any disclaimer, the term of this patent is extended or adjusted under 35 U.S.C. 154(b) by 229 days.

(21) Appl. No.: 11/412,571

(22) Filed: Apr. 27, 2006

(65) Prior Publication Data

US 2006/0248931 A1 Nov. 9, 2006

Related U.S. Application Data

(60) Provisional application No. 60/675,112, filed on Apr. 27, 2005.

(51) Int. Cl.
*B60R 25/10* (2006.01)

(52) U.S. Cl. ................ 340/426.36; 340/5.72; 340/5.73; 307/10.1

(58) Field of Classification Search ............ 340/426.36, 340/426.13, 542, 5.61, 5.72, 5.73; 307/9.1, 307/10.1; 70/263, 264
See application file for complete search history.

(56) References Cited

U.S. PATENT DOCUMENTS 4,677,834 A 7/1987 Hicks
4,854,143 A 8/1989 Corder et al.
4,971,143 A 11/1990 Detweiler et al.
5,040,390 A 8/1991 Mistry et al.
5,216,909 A 6/1993 Armoogam
5,537,848 A 7/1996 Grzanka et al.
5,636,536 A 6/1997 Kinnucan
5,816,085 A 10/1998 Winardi et al.
5,823,026 A 10/1998 Finke
5,896,769 A 4/1999 Elpern et al.
5,960,656 A 10/1999 Yao
5,974,912 A 11/1999 Cheng et al.
6,038,896 A 3/2000 Chamberlain et al.
6,067,826 A 5/2000 Holloway et al.
6,089,057 A 7/2000 Spurr
6,112,564 A 9/2000 Rathmann et al.
6,116,067 A 9/2000 Myers et al.
6,250,119 B1 6/2001 Flon
6,318,138 B1 11/2001 Mathews et al.
6,341,513 B1 1/2002 Chen
6,367,296 B1 4/2002 Dupont
6,397,646 B1 6/2002 Doong
6,412,318 B1 7/2002 Shen
6,418,763 B1 7/2002 Huang
6,487,884 B1 12/2002 Constantinou
6,539,755 B1 4/2003 Bruwer et al.
6,612,141 B2 9/2003 Bates et al.
6,640,594 B1 11/2003 Yao
6,644,072 B1 11/2003 Hsieh
6,658,905 B1 12/2003 Hsieh
6,666,054 B1 12/2003 Hsieh
6,698,263 B2 3/2004 Hsieh (Continued)

*Primary Examiner*—John A Tweel, Jr.
(74) *Attorney, Agent, or Firm*—Fraser Clemens Martin & Miller LLC; J. Douglas Miller

(57) ABSTRACT

A keyless entry system is disclosed for use in an entry system wherein the latching mechanism may be locked or unlocked by either a key or a remotely controlled mechanism.

20 Claims, 9 Drawing Sheets

U.S. PATENT DOCUMENTS

| | | | | |
|---|---|---|---|---|
| 6,714,118 | B1 | 3/2004 | Frolov et al. | |
| 6,963,794 | B2 * | 11/2005 | Geber et al. | 340/426.13 |
| 6,964,183 | B2 | 11/2005 | Keightley | |
| 7,106,172 | B2 * | 9/2006 | Neveux et al. | 340/5.72 |
| 7,212,114 | B2 * | 5/2007 | Yui et al. | 340/542 |
| 7,315,242 | B2 * | 1/2008 | Eisenman | 340/426.13 |
| 2001/0010166 | A1 | 8/2001 | Doucet et al. | |
| 2001/0029760 | A1 | 10/2001 | Viney | |
| 2002/0062670 | A1 | 5/2002 | Doong | |
| 2003/0095040 | A1 * | 5/2003 | Shimomura | 340/426.13 |
| 2004/0011097 | A1 | 1/2004 | Jeffers | |
| 2004/0040355 | A1 | 3/2004 | Goldman | |
| 2005/0081582 | A1 | 4/2005 | Isaacs et al. | |
| 2005/0179517 | A1 * | 8/2005 | Harms et al. | 340/5.73 |
| 2007/0018790 | A1 * | 1/2007 | LaFrance | 340/5.72 |
| 2007/0290792 | A1 * | 12/2007 | Tsuchimochi et al. | 340/5.72 |

* cited by examiner

KEYLESS ENTRY SYSTEM

CROSS-REFERENCE TO RELATED APPLICATION

This application claims the benefit of U.S. Provisional Patent Application Ser. No. 60/675,112 filed on Apr. 27, 2005.

FIELD OF THE INVENTION

The present invention relates generally to keyless entry systems and more particularly to keyless entry systems which may be operated remotely of the location of the entry.

BACKGROUND OF THE INVENTION

Remotely operated keyless entry systems are presently widely used. A high percentage of vehicles are provided with remote keyless entry systems which are either provided as standard equipment or as an option.

Most remote keyless entry systems alarm the vehicle against theft and lock and unlock the doors and the trunks of the equipped vehicles. Remote keyless entry systems typically consist of a key fob transmitter and an associated receiver inside the vehicle.

While remote keyless entry systems have become very popular for use in vehicles, it must be understood that entry systems of buildings, trailers, boats, etc. are likely candidates for such theft prevention systems, both as original equipment or as an after-market accessory.

There is a need for a remote keyless entry system which is simple in structure and may be readily and easily adapted to a wide variety of end uses.

Accordingly, it would be desirable to produce a keyless entry system which is simple in structure and could be easily installed as original equipment or as an after-market accessory.

SUMMARY OF THE INVENTION

A keyless entry system which is simple in structure and can be easily installed as original equipment or as an after-market accessory, as well as others, has surprisingly been discovered.

In one embodiment, a keyless entry system comprises, a housing; a latch assembly disposed within the housing and including an operating shaft having a first end extending outwardly of the housing and terminating in a manually manipulated handle, the shaft including an aperture formed therein; a remotely actuated power locking mechanism disposed within the housing; a key actuated locking mechanism disposed within the housing; and a sliding member interposed between and operably connected with the power locking mechanism and the key actuated locking mechanism, the sliding member including a detent for selective engagement with the aperture of the shaft to selectively lock and unlock the latch assembly.

In another embodiment, a keyless entry system comprises, a housing; a latch assembly disposed within the housing and including an operating shaft having a first end extending outwardly of the housing and terminating in a manually manipulated handle, the shaft including an aperture formed therein; a remotely actuated power locking mechanism disposed within the housing; a key actuated locking mechanism disposed within the housing; and a pin slidably received in the aperture on the shaft of the latch assembly, wherein the pin is movable by the power locking mechanism and the key actuated locking mechanism to selectively lock and unlock the latch assembly.

In yet another embodiment, a keyless entry system comprises, a housing; a latch assembly disposed within the housing and adapted to be selectively locked and unlocked; a remotely actuated power locking mechanism disposed within the housing for selectively locking and unlocking the latch assembly; a terminal assembly including a pair of conductive terminals; and an electrical connector in electrical communication with a source of electricity and adapted to engage the terminal assembly, the electrical connector including a non-conductive pin adapted to be received between the pair of conductive terminals of the terminal assembly to form an electric circuit.

BRIEF DESCRIPTION OF THE DRAWINGS

The objects and advantages of the present invention will become readily manifest to those skilled in the art from reading the following description of a preferred embodiment of the invention when considered in the light of the accompanying drawings, in which.

DETAILED DESCRIPTION OF THE PREFERRED EMBODIMENT

Figure 1:
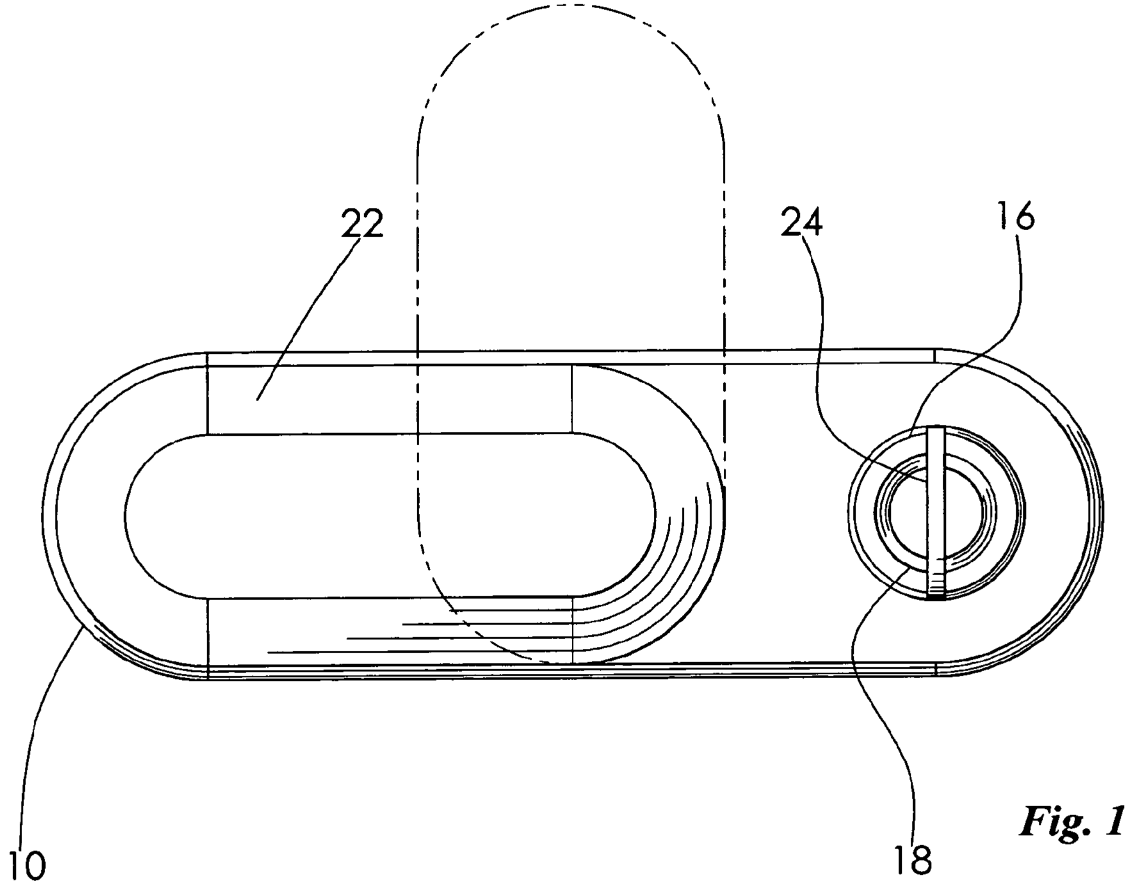
FIG. 1 is a front elevational view of a keyless entry system according to an embodiment of the invention including a housing containing operative parts of the keyless entry system.

The objects and advantages of the present invention will become readily manifest to those skilled in the art from reading the following description of a preferred embodiment of the invention when considered in the light of the accompanying drawing.

Referring to the drawings, there is illustrated a keyless entry system incorporating the features of the invention including a housing 10 configured to enclose the operational and functional elements of the invention. The housing 10 can be formed in plastic material or a metal stamping or casting, for example. The housing 10 may be provided with means for attachment (not shown) to an associated structure such as a door, trunk, camper entry, etc. The front of the housing 10 is provided with an aperture 12 for receiving a latch assembly 14, and an aperture 16 for receiving a key actuated locking mechanism 18, as more clearly shown in FIGS. 2-6.

Figure 2:
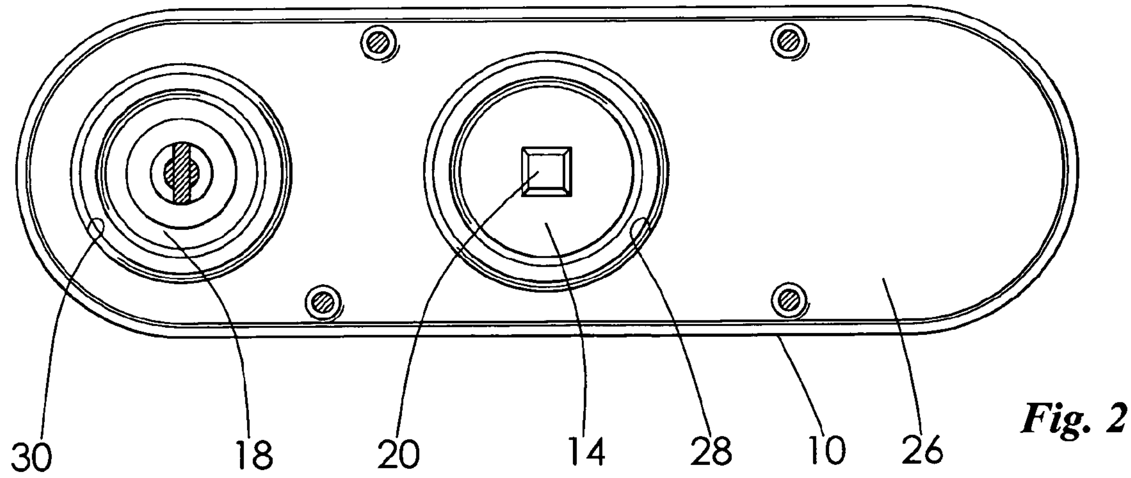
FIG. 2 is a rear elevational view of the housing illustrated in FIG. 1.

The housing 10 is provided with a backing plate or cover 26 which may be secured to the housing 10 by threaded fasteners (not shown) or other suitable fastening means, as illustrated in FIG. 2.

The latch assembly 14 includes a centrally disposed shaft 20, the outermost end of which is attached to a palm handle 22 or other suitable handle. The palm handle 22 is operative to rotate the shaft 20 about the longitudinal axis thereof from the normal position shown in FIG. 1 in full lines, to the position illustrated in phantom lines, to actuate a latch (not shown) of an associated entry system.

The outermost end of the key actuated locking mechanism 18 is adapted to receive a key 24 for selectively moving the locking mechanism 18 to a locking position or an unlocking position. While the locking mechanism 18 may be of a variety of types, it has been discovered that favorable results are attained using a self centering type locking mechanism. The self centering type mechanism normally maintains the key receiving slot and the associated key 24 in the static position illustrated in FIG. 1. Spring means (not shown) may be employed to urge the mechanism 18 to the static position when any rotational torque being applied to the key 24 is released. The locking mechanism 18 is provided with an integral radially outwardly extending arm 32 which terminates in a transversely extending end portion 34, as illustrated in FIGS. 3-6.

The backing plate or cover 26 is provided with an aperture 28 which receives the latch assembly 14 and the associated shaft 20 therein. An aperture 30 is formed in the backing plate or cover 26 spaced from the aperture 28 for receiving the locking mechanism 18.

Figure 3:
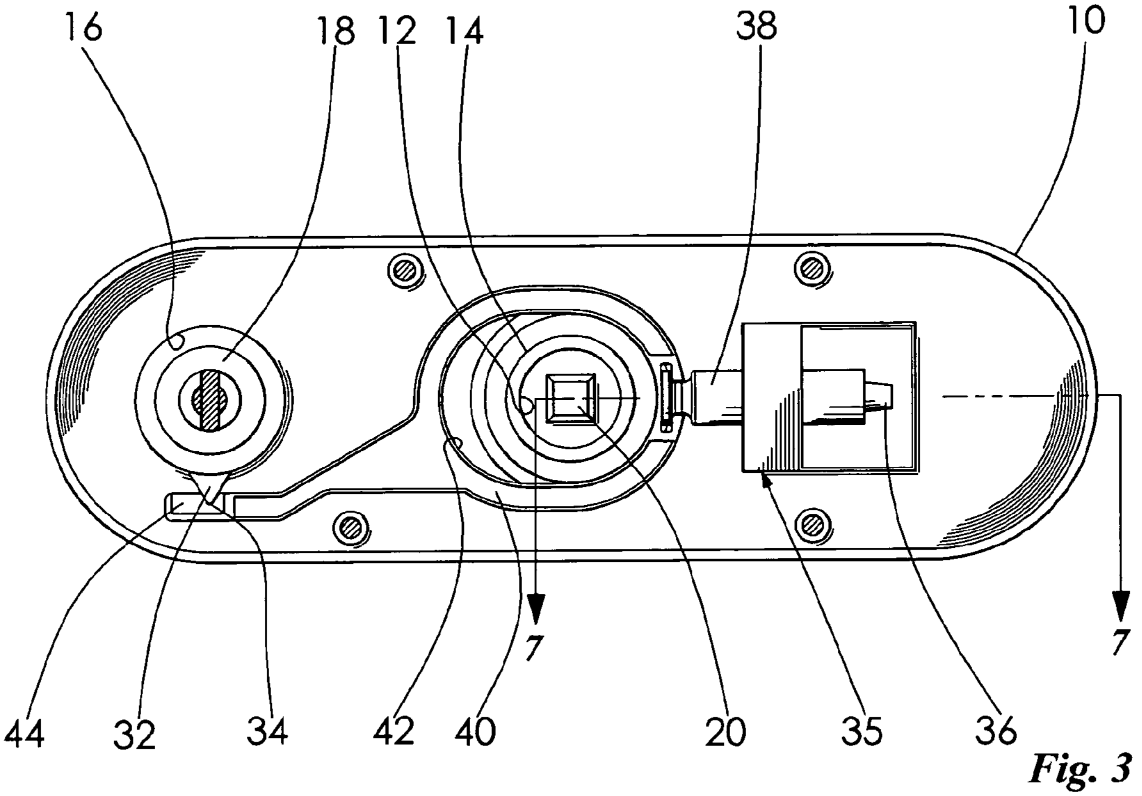
FIG. 3 is a rear elevational view of the housing illustrated in FIG. 2 with the back panel removed to expose the internal operational components thereof in a normal static locked position with the remotely actuated locking mechanism in a keyless locked position.
Figure 4:
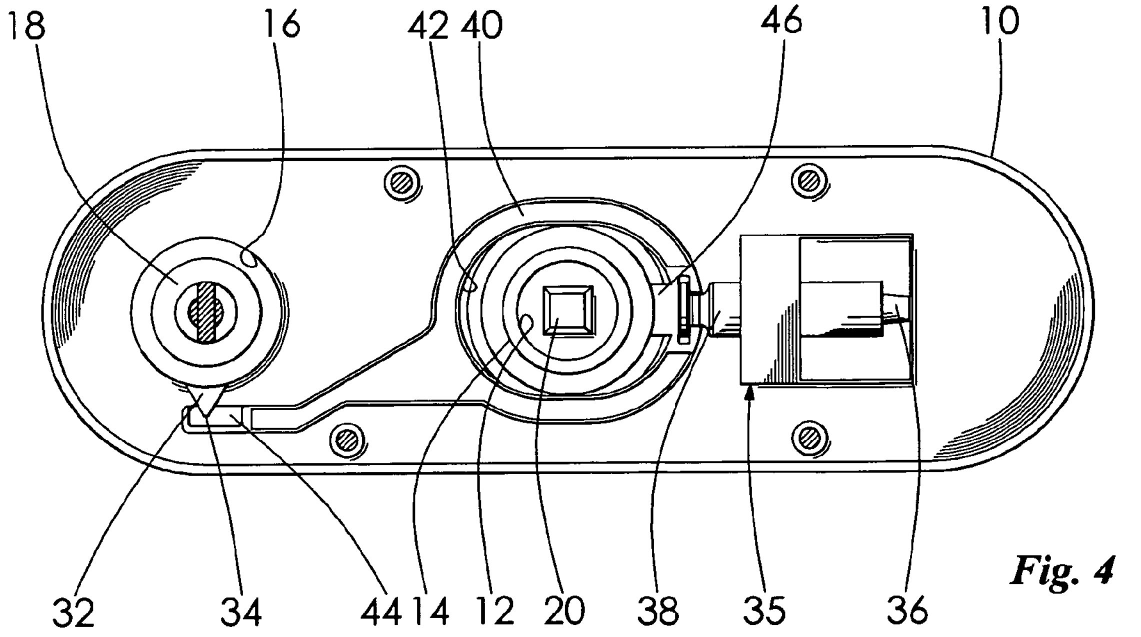
FIG. 4 is a view similar to FIG. 3 with the remotely actuated locking mechanism in a keyless unlocked position.
Figure 5:
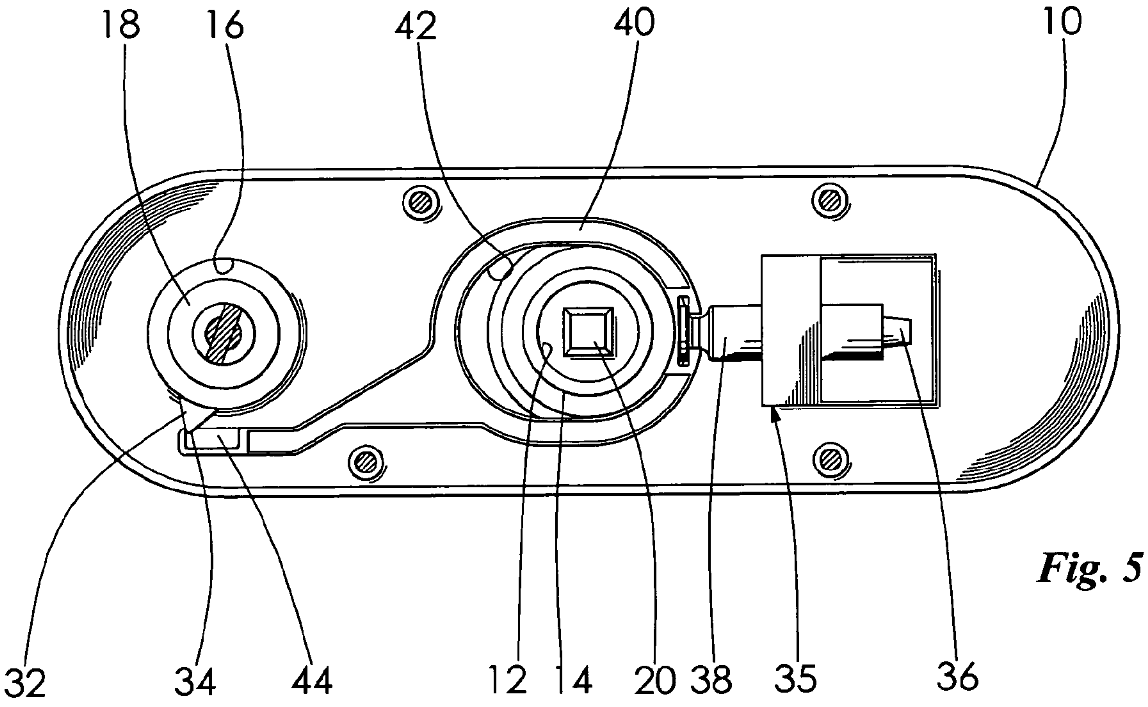
FIG. 5 is a view similar to FIG. 4 with the key actuated locking mechanism in a key locked position.
Figure 6:
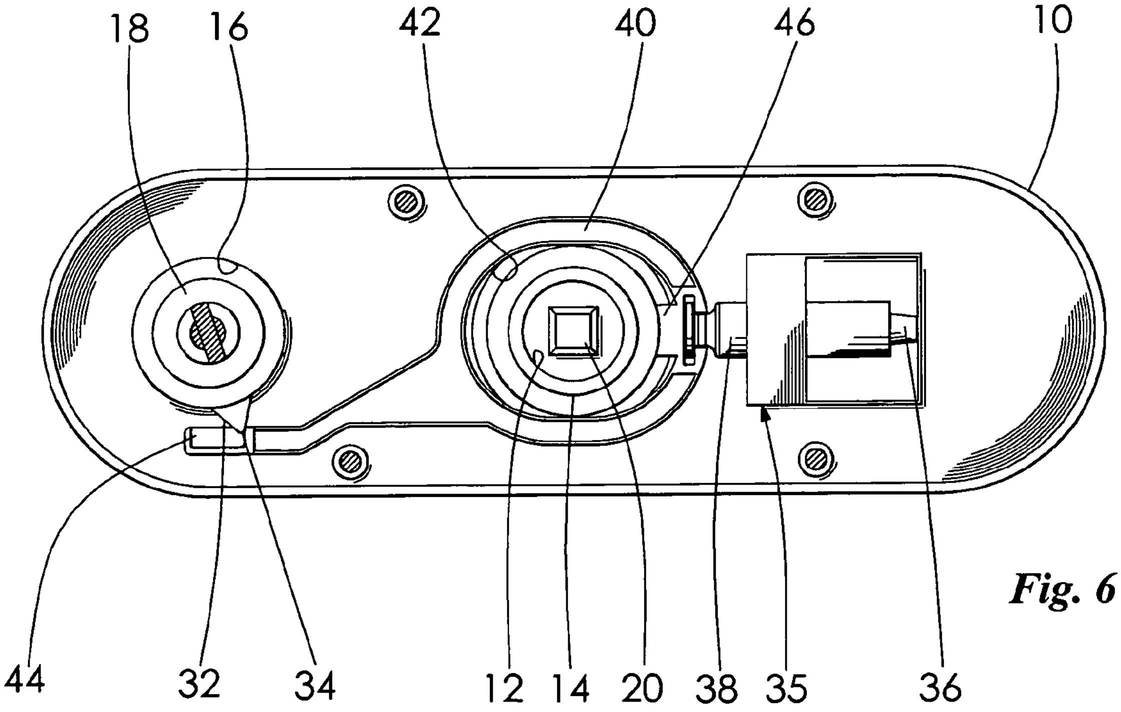
FIG. 6 is a view similar to FIG. 4 with the key actuated locking mechanism in a key unlocked position.

In FIGS. 3-6, a remotely actuated power locking mechanism 35 is shown disposed in the housing 10. The power locking mechanism 35 includes an actuator 36 having an associated armature 38. The actuator 36 can be any conventional operator such as a solenoid, for example. Upon energization of the actuator 36, the armature 38 is caused to be moved to one of an extended position as shown in FIGS. 3 and 5, or a retracted position as shown in FIGS. 4 and 6.

Figure 7:
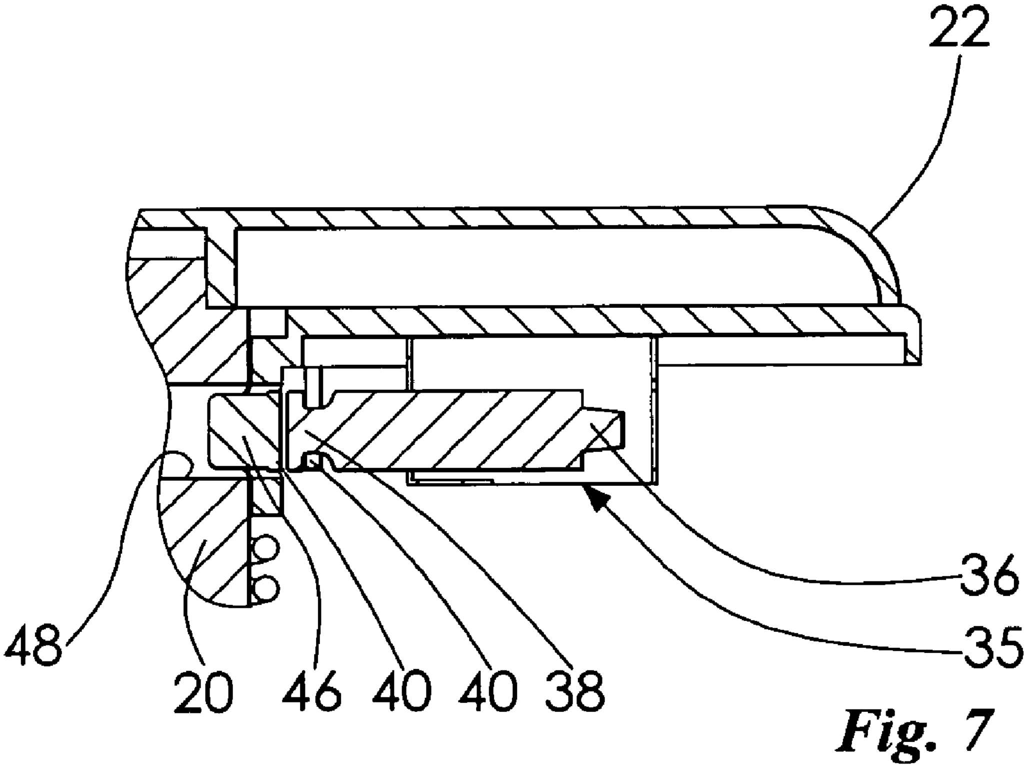
FIG. 7 is a fragmentary sectional view taken along line 7-7 of FIG. 3.

An elongate sliding member 40, having a central aperture 42, has one end coupled to the armature 38 of the actuator 36, and the opposite end provided with a slot 44 for receiving the terminal end portion 34 of the radially extending arm 32 of the locking mechanism 18. The central aperture 42 is provided with an inwardly extending tab or detent 46 formed on the sliding member 40 adapted to engage an aperture 48 in the form of a slot, hole, groove, or recess formed in the shaft 20 of the latch mechanism 14, as more clearly shown in FIG. 7. It is understood that the tab 46 could be formed separately from the sliding member 40 without departing from the scope or spirit of the invention.

While the sliding member 40 is shown with a central aperture 42 which is generally circular, it will be understood that the member 40 may be formed of different configurations such as having generally straight end portions for connecting with the remotely actuated power locking mechanism 35 and the key actuated locking mechanism 18, respectively, and a curved interconnecting central portion. The function of the sliding member 40 is to mechanically interconnect the remotely actuated power locking mechanism 35 and the key actuated locking mechanism 18 to selectively permit or militate against the rotation of the shaft 20 of the latch assembly 14.

In operation, the locked position of the keyless entry system of the invention is illustrated in FIG. 3. As illustrated, the shaft 20 is prevented from rotation due to the insertion of the tab 46 into the aperture 48 of the shaft 20. The keyless entry system is in a locked position and militates against rotation of the shaft 20 of the palm handle 22.

To unlock the keyless entry system, the tab 46 is moved outwardly to disengage from the aperture 48 of the shaft 20. The tab 46 may be moved outwardly by selecting one of two alternatives. One of the alternatives involves operation of the actuator 36 to cause the armature 38 and the sliding member 40 to move from the position illustrated in FIG. 3 to the position illustrated in FIG. 4. Such movement of the sliding member 40 permits the tab 46 to disengage from the aperture 48 of the shaft 20, thus enabling the palm handle 22 to effect rotation of the shaft 20.

The operation of the actuator 36 may be typically achieved by a receiver (not shown) in relatively close proximity to the actuator 36 which will, upon receiving an appropriate signal from a transmitter (not shown) such as a key fob, cause operation of the actuator 36. Such systems are commercially available, for example, from Dallas Semiconductor Corp., Dallas, Tex. 75244.

The other alternative, as illustrated in FIGS. 5 and 6, involves actuation of the locking mechanism 18 by the key 24. Rotation of the key 24 causes movement of the radially extending arm 32. As the arm 32 is caused to move, the terminal end 34 abuts an end wall of the slot 44 of the sliding member 40 to cause the sliding member 40 to move from the position shown in FIG. 5 to the position shown in FIG. 6, thus permitting the tab 46 to disengage from the aperture 48.

FIG. 5 illustrates the locked condition of the system wherein the locking mechanism 18 has been rotated to position the terminal end 34 and the arm 32 against one end wall of the slot 44, which causes the tab 46 to move into engagement with the aperture 48 of the shaft 20.

Figure 8:
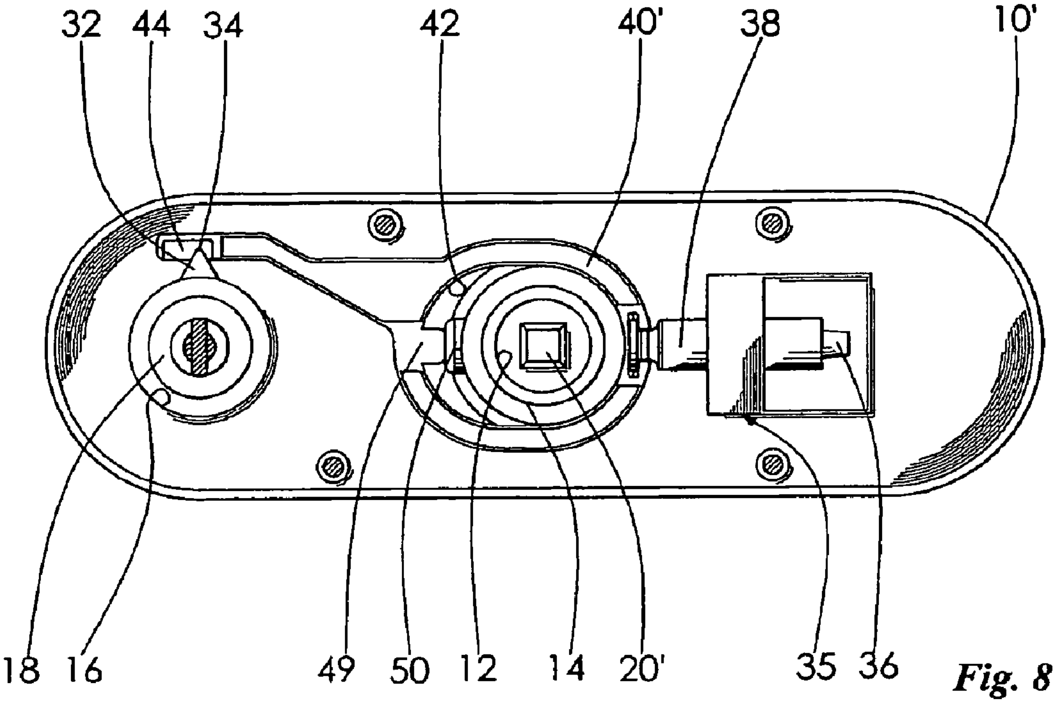
FIG. 8 is a rear elevational view of a housing in accordance with another embodiment of the invention with the back panel removed to expose the internal operational components thereof in a normal static locked position.
Figure 9:
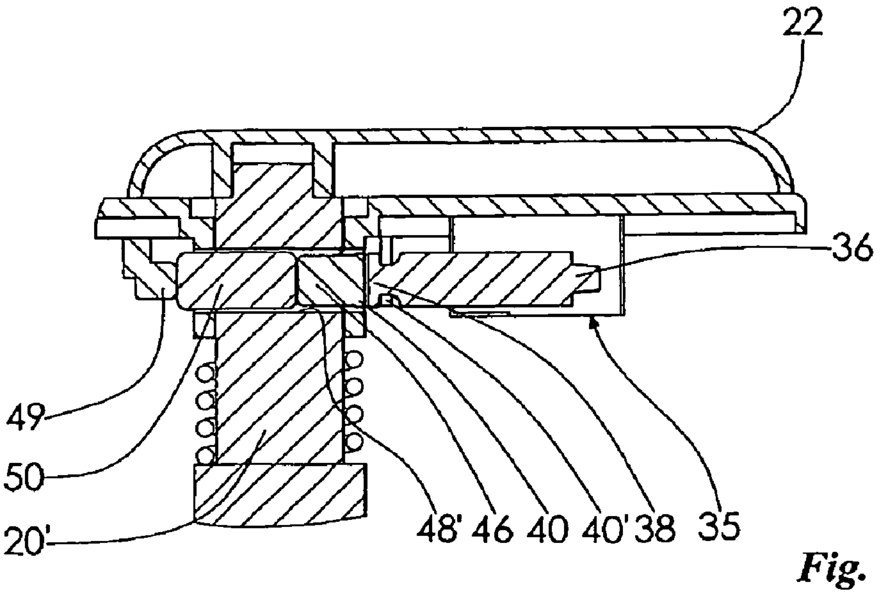
FIG. 9 is a fragmentary sectional view similar to FIG. 7 according to the embodiment illustrated in FIG. 8.

FIGS. 8 and 9 show a keyless entry system incorporating the features of another embodiment of the invention, including a housing 10' configured to enclose the operational and functional elements of the invention. Similar structure to that described above for FIG. 1 and repeated herein includes the same reference numeral and a prime (') symbol. In this embodiment, a second tab or detent 49 is formed on the sliding member 40' and is adapted to engage a pin 50. It is understood that the tab 49 could be formed separately from the sliding member 40 without departing from the scope or spirit of the invention. The pin 50 is slidably disposed in the aperture 48' formed in the shaft 20'. The remaining structure is the same as discussed above for FIGS. 1-7. When the keyless entry system is in a locked position, the pin 50 and the tab 46 engage the aperture 48' of the shaft 20' to militate against the rotation of the shaft 20' as shown in FIG. 8.

However, when the keyless entry system is in an unlocked position (not shown), the pin 50 and tab 46 are disengaged from the aperture 48' of the shaft 20' to permit the rotation of the shaft 20'.

In operation, the shaft 20' is prevented from rotation due to the engagement of the pin 50 and the tab 46 with the aperture 48' of the shaft 20'. Accordingly, when the keyless entry system is in a locked position, rotation of the shaft 20' is militated against, and the operating palm handle 22 may not be rotated. The shaft 20' may be permitted to rotate upon unlocking of the keyless entry system by one of the two alternatives discussed above. Upon unlocking of the keyless entry system, the pin 50 and tab 46 are disengaged from the shaft 20', thus allowing a rotation of the shaft 20'. The addition of the pin 50 to the keyless entry system provides a two-point locking system, wherein the pin 50 and the tab 46 each militate against rotation of the shaft 20'. The two-point locking system increases security and reduces stresses and wear on the keyless entry system, thus maximizing the life of the keyless entry system.

Figure 10:
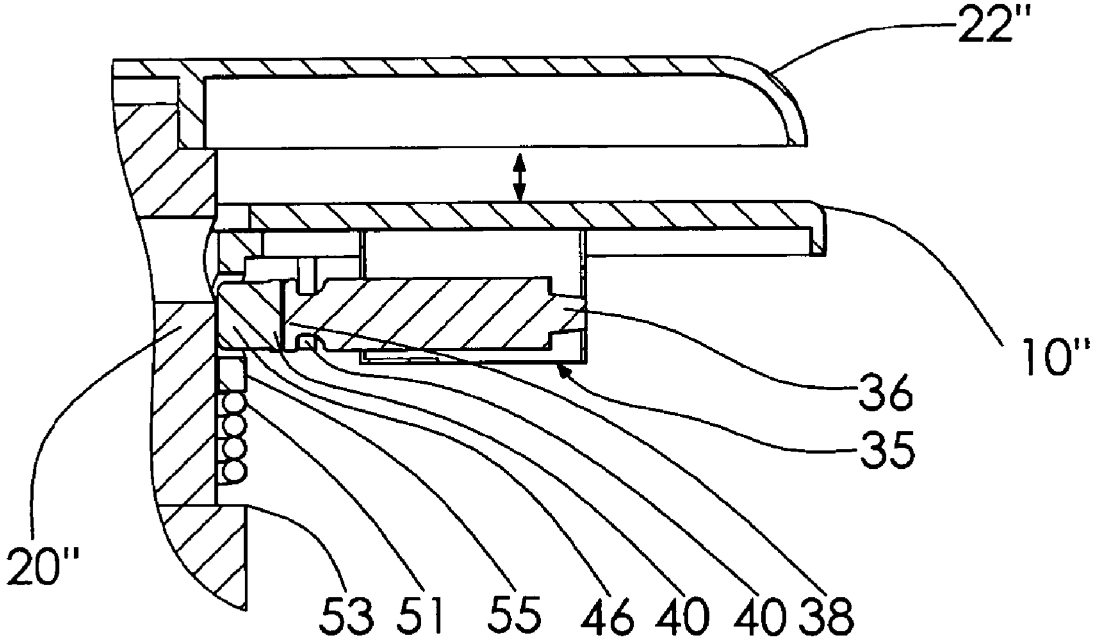
FIG. 10 is a fragmentary sectional view similar to FIG. 7 according to another embodiment of the invention.

FIG. 10 shows a keyless entry system incorporating the features of another embodiment of the invention, including the operational and functional elements of the invention and an operating palm handle 22". Similar structure to that described above for FIG. 1 and repeated herein includes the same reference numeral and a double prime (") symbol. In this embodiment, the shaft 20" includes a spring 51 or similar device disposed thereon. The spring 51 abuts a collar 53 disposed or formed on the shaft 20" at a first end and a collar 55 disposed or formed on the housing 10" at a second end. The spring 51 allows for the palm handle 22" and shaft 20" to be pulled outwardly and spaced apart from the housing 10" when the keyless entry system is in an unlocked position. The remaining structure is the same as discussed above for FIGS. 1-7.

In operation, the palm handle 22" can be manually pulled outwardly to create spacing from the housing 10". This operation can be performed when the tab 46 is not engaged with the shaft 20" and the keyless entry system is in an unlocked position. To create the spacing between the palm handle 22" and the housing 10", force is applied outwardly to the palm handle 22". The palm handle 22" and the shaft 20" cooperatively slide outwardly from the housing 10" and return to their normal static position when the force is released. As the palm handle 22" and shaft 20" are pulled outwardly, the spring 51 is caused to compress. The spacing created between the palm handle 22" and the housing 10" serves as an anti-pinching aid by reducing direct surface contact between palm handle 22" and the housing 10". As the outward force applied to the palm handle 22" is released, the spring 51 expands to its normal static position and the palm handle 22" and shaft 20" return to their static positions.

Figure 11:
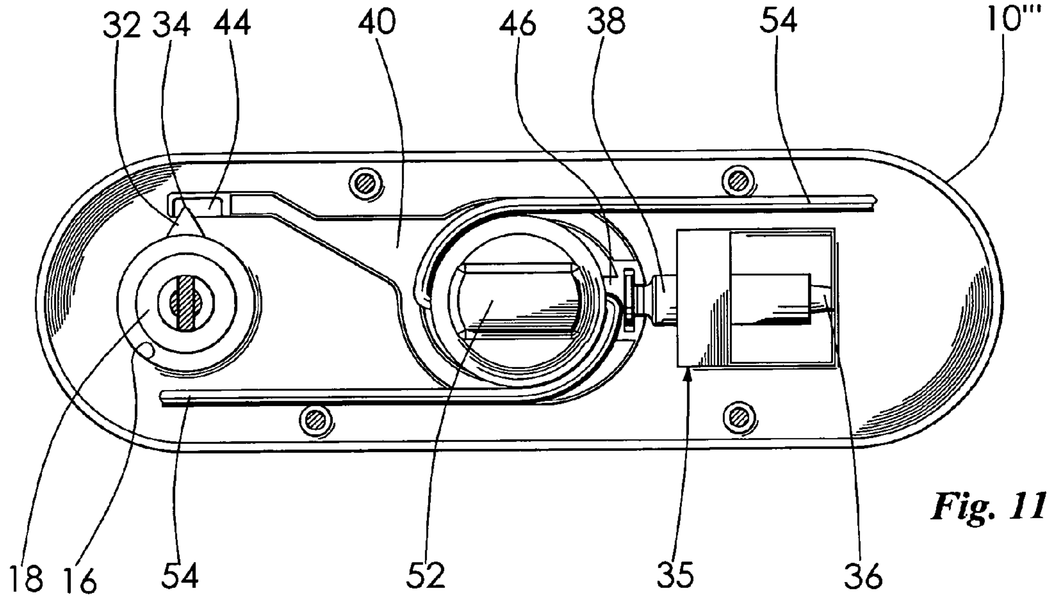
FIG. 11 is a rear elevational view of a housing according to another embodiment of the invention showing an emergency release knob, with the back panel removed to expose the internal operational components thereof in a normal static locked position.

FIG. 11 shows a rear elevational view of a housing 10''' including an emergency release knob 52 in accordance with another embodiment of the invention, wherein a backing plate or cover (not shown) is removed from the housing 10'''. Similar structure to that described above for FIG. 1 and repeated herein includes the same reference numeral and a triple prime (''') symbol. The emergency release knob 52 is disposed at a second end of the shaft (not shown). The emergency release knob 52 extends through an aperture (not shown) formed in the backing plate and is accessible from the back side of the housing 10'''. The emergency release knob 52 is in communication with a cable or similar device 54 at a middle portion thereof. The cable 54 is attached at a first and second end to a latch (not shown) of an associated entry system (not shown). It is understood that more cables can be used without departing from the spirit or scope of the invention as desired, wherein the emergency release knob 52 may be attached to first ends of the cables rather than at a middle portion of the cables. The remaining structure is the same as discussed above for FIGS. 1-7.

The emergency release knob 52 allows for an opening of the entry system from the rear side of the housing 10''' without the use of a key (not shown) or a remote (not shown) to unlock the keyless entry system. When the emergency release knob 52 is rotated, tension is created in the cable 54 causing actuation of the latch, thus causing the entry system to open. In this operation, rotation of the shaft to actuate the latch is bypassed.

Figure 12:
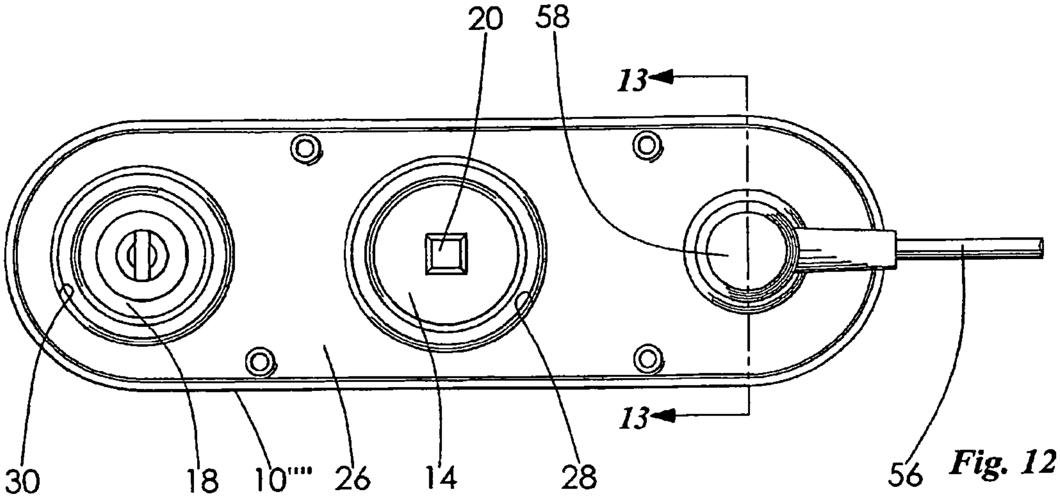
FIG. 12 is a rear elevational view of a housing including a power cord and plug in accordance with another embodiment of the invention.

FIG. 12 shows a rear elevational view of a housing 10'''' including an electrical lead 56 attached to an electrical conductor 58 at a first end and a power source (not shown) at a second end. Similar structure to that described above for FIG. 1 and repeated herein includes the same reference numeral and a quadruple prime ('''') symbol. The electrical lead 56 and electrical conductor 58 supply electrical power to the keyless entry system from the power source.

Figure 13:
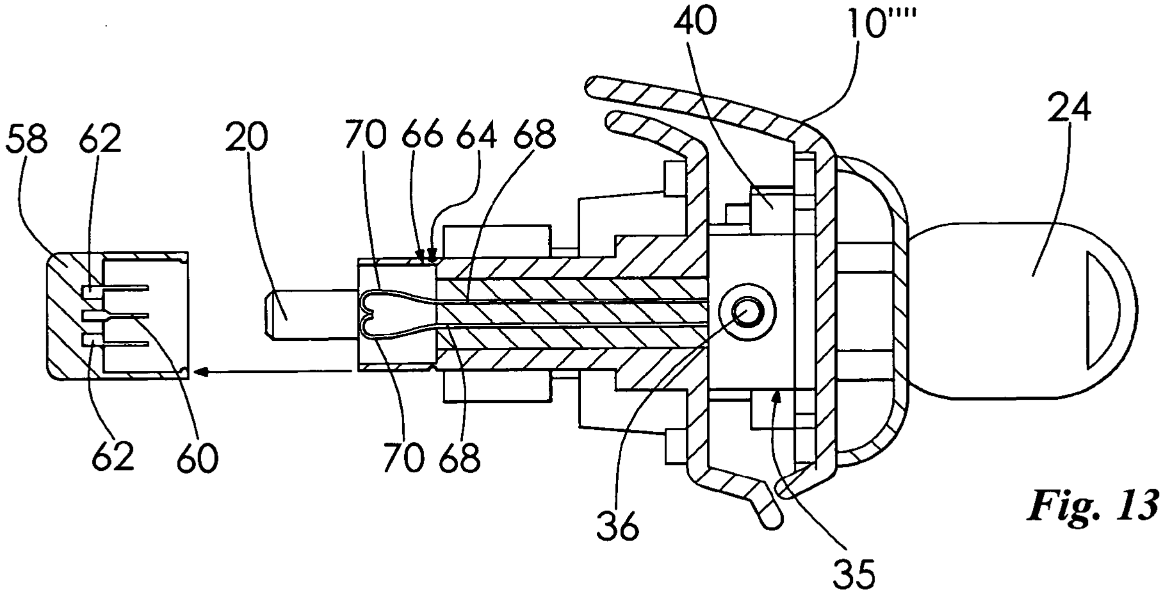
FIG. 13 is a sectional view of the housing illustrated in FIG. 12, taken along line 13-13 and showing the plug disengaged from the housing.

As more clearly shown in FIG. 13, the electrical conductor 58 includes a pin 60 and a pair of terminals 62 extending outwardly therefrom. The pin 60 is formed from a non-conductive material such as plastic, for example. The terminals 62 are formed from a conductive material such as metal, for example. The housing 10'''' includes an aperture 64 formed therein adapted to receive the electrical conductor 58. A terminal assembly 66 is disposed in the aperture 64 and includes a pair of conductive terminals 68. The terminals 68 are substantially J-shaped.

Figure 14:
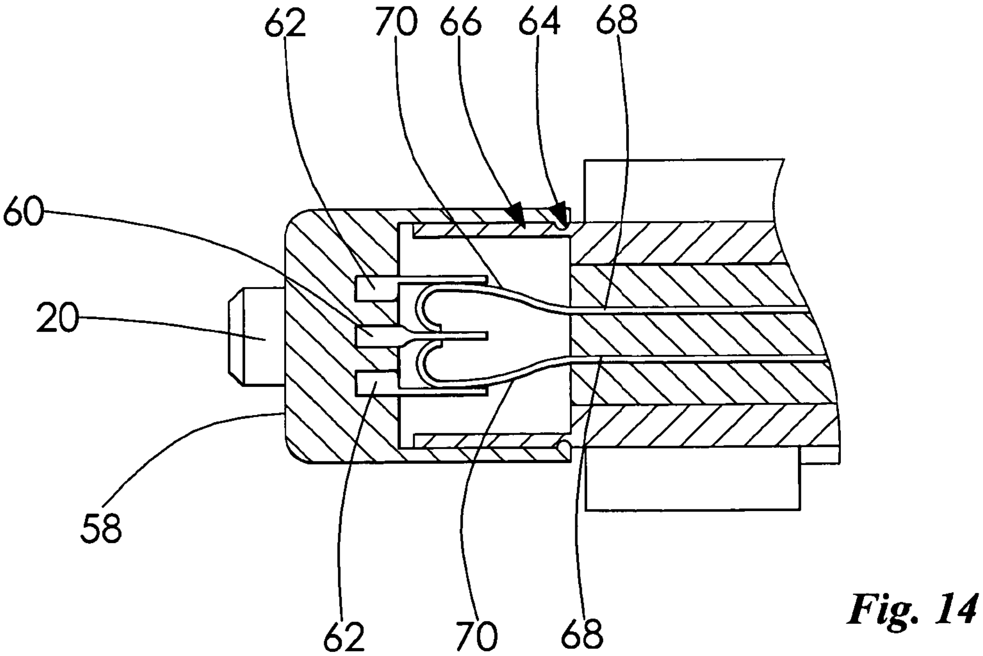
FIG. 14 is a fragmentary sectional view of the housing illustrated in FIG. 12, showing the plug engaged with the housing.

In use, the conductive terminals 68 abut each other to short circuit an electrical path. When the electrical conductor 58 is inserted into the aperture 64 formed in the housing 10, the pin 60 causes the pair of conductive terminals 68 to be moved laterally outwardly from one another, as shown in FIG. 14, thus forming a complete circuit. The insertion of the pin 60 between the terminals 68 causes outer edges 70 of the terminals 68 to contact the conductive terminals 62 of the electrical conductor 58 to create a conductive path.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A keyless entry system comprising:

a housing;

a latch assembly disposed within said housing and including an operating shaft having a first end extending outwardly of said housing and terminating in a manually manipulated handle,the shaft including an aperture formed therein;

a remotely actuated power locking mechanism disposed within said housing;

a key actuated locking mechanism disposed within said housing; and a sliding member interposed between and operably connected with said power locking mechanism and said key actuated locking mechanism, said sliding member including a detent for selective engagement with the aperture of the shaft to selectively lock and unlock said latch assembly.

2. A keyless entry system according to claim 1 wherein said remotely actuated power locking mechanism includes a solenoid.

3. A keyless entry system according to claim 1 wherein said key actuated locking mechanism is self centering.

4. A keyless entry system according to claim 1 wherein said remotely actuated power locking mechanism and said key actuated locking mechanism are spaced apart from one another and said latch mechanism is interdigitated therebetween.

5. A keyless entry system according to claim 1 wherein the handle is laterally extendable from said housing to form a space therebetween and militate against pinching of a hand of an operator.

6. A keyless entry system according to claim 1 wherein the shaft includes a second end spaced from the first end and extending laterally outwardly of said housing, the second end terminating in an emergency release knob.

7. A keyless entry system according to claim 1 wherein the detent of said sliding member engages a pin that is slidably disposed in the aperture of said latch assembly, the detent and the pin cooperating to provide a two-point locking system.

8. A keyless entry system according to claim 1 further comprising a terminal assembly including a pair of conductive terminals and an electrical connector in electrical communication with a source of electricity and adapted to engage the terminal assembly, the electrical connector including a non-conductive pin adapted to be received between the pair of conductive terminals of the terminal assembly to form an electric circuit.

9. A keyless entry system comprising:

a housing;

a latch assembly disposed within the housing and including an operating shaft having a first end extending outwardly of the housing and terminating in a manually manipulated handle, the shaft including an aperture formed therein;

a remotely actuated power locking mechanism disposed within said housing;

a key actuated locking mechanism disposed within said housing; and a pin slidably received in the aperture on the shaft of the latch assembly, wherein the pin is movable by the power locking mechanism and the key actuated locking mechanism to selectively lock and unlock the latch assembly.

10. A keyless entry system according to claim 9 wherein said remotely actuated power locking mechanism and said key actuated locking mechanism are spaced apart from one another and said latch mechanism is interdigitated therebetween.

11. A keyless entry system according to claim 9 wherein the handle is laterally extendable from said housing to form a space therebetween and militate against pinching of a hand of an operator.

12. A keyless entry system according to claim 9 wherein the shaft includes a second end spaced from the first end and extending laterally outwardly of said housing, the second end terminating in an emergency release knob.

13. A keyless entry system according to claim 9 further comprising a terminal assembly including a pair of conductive terminals and an electrical connector in electrical communication with a source of electricity and adapted to engage the terminal assembly, the electrical connector including a non-conductive pin adapted to be received between the pair of conductive terminals of the terminal assembly to form an electric circuit.

14. A keyless entry system comprising:

a housing;

a latch assembly disposed within said housing and adapted to be selectively locked and unlocked;

a remotely actuated power locking mechanism disposed within said housing for selectively locking an unlocking the latch assembly;

a terminal assembly including a pair of conductive terminals; and an electrical connector in electrical communication with a source of electricity and adapted to engage said terminal assembly, said electrical connector including a non-conductive pin adapted to be received between the pair of conductive terminals of said terminal assembly to form an electric circuit.

15. A keyless entry system according to claim 14 further comprising a key actuated locking mechanism disposed within said housing.

16. A keyless entry system according to claim 15 wherein said remotely actuated power locking mechanism and the key actuated locking mechanism are spaced apart from one another and said latch mechanism is interdigitated therebetween.

17. A keyless entry system according to claim 16 said latch assembly includes an operating shaft having a first end extending outwardly of the housing and terminating in a manually manipulated handle, the shaft including an aperture formed therein.

18. A keyless entry system according to claim 17 further comprising a sliding member interposed between and operably connected with said power locking mechanism and the key actuated locking mechanism, the sliding member including a detent for selective engagement with the aperture of the shaft to selectively lock and unlock said latch assembly.

19. A keyless entry system according to claim 17 wherein the handle is laterally extendable from said housing to form a space therebetween and militate against pinching of a hand of an operator.

20. A keyless entry system according to claim 17 wherein the shaft includes a second end spaced from the first end and extending laterally outwardly of said housing, the second end terminating in an emergency release knob.

* * * * *